US009835803B2

(12) United States Patent
Leigh et al.

(10) Patent No.: US 9,835,803 B2
(45) Date of Patent: Dec. 5, 2017

(54) ATTACHING CONNECTORS

(71) Applicant: HEWLETT PACKARD ENTERPRISE DEVELOPMENT LP, Houston, TX (US)

(72) Inventors: Kevin B. Leigh, Houston, TX (US); George D. Megason, Spring, TX (US); Chong Sin Tan, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/021,216

(22) PCT Filed: Oct. 2, 2013

(86) PCT No.: PCT/US2013/062959
§ 371 (c)(1),
(2) Date: Mar. 10, 2016

(87) PCT Pub. No.: WO2015/050533
PCT Pub. Date: Apr. 9, 2015

(65) Prior Publication Data
US 2016/0223755 A1    Aug. 4, 2016

(51) Int. Cl.
*G02B 6/38* (2006.01)
*H01R 13/629* (2006.01)
*H01R 13/514* (2006.01)

(52) U.S. Cl.
CPC ......... *G02B 6/3817* (2013.01); *G02B 6/3897* (2013.01); *H01R 13/629* (2013.01); *G02B 6/3885* (2013.01); *H01R 13/514* (2013.01)

(58) Field of Classification Search
CPC .. G02B 6/3887; G02B 6/3893; G02B 6/3825; G02B 6/4292; G02B 6/3897
See application file for complete search history.

(56) References Cited

U.S. PATENT DOCUMENTS

| 5,363,459 A | * | 11/1994 | Hultermans ......... G02B 6/3846 |
| | | | 385/53 |
| 5,559,918 A | | 9/1996 | Furuyama et al. |
| 6,033,125 A | | 3/2000 | Stillie et al. |
| 6,295,394 B1 | | 9/2001 | Arab-Sadeghabadi |
| 6,461,053 B1 | | 10/2002 | Mayercik et al. |
| 6,860,642 B2 | | 3/2005 | Vodrahalli et al. |

(Continued)

FOREIGN PATENT DOCUMENTS

| JP | 04138677 | 5/1992 |
| JP | 2002365475 A | 12/2002 |

(Continued)

OTHER PUBLICATIONS

The International Search Report and the Written Opinion of the International Searching Authority for PCT/US2013/062959 dated Jun. 17, 2014; 10 pages.

*Primary Examiner* — Jennifer Doan
(74) *Attorney, Agent, or Firm* — Trop, Pruner & Hu, P.C.

(57) ABSTRACT

A connector assembly includes a first connector that has an attachment feature. A second connector is removably attachable to the attachment feature of the first connector without establishing communication with the first connector. One of the first and second connectors is an optical connector, and another of the first and second connectors is an electrical connector.

20 Claims, 7 Drawing Sheets

(56) References Cited

U.S. PATENT DOCUMENTS

| | | |
|---|---|---|
| 7,073,953 B2 | 7/2006 | Roth et al. |
| 7,234,880 B1 | 6/2007 | Charny et al. |
| 8,083,547 B2 | 12/2011 | Roth et al. |
| 8,249,410 B2 | 8/2012 | Andrus et al. |
| 2005/0036743 A1 | 2/2005 | Dugas |
| 2007/0092185 A1* | 4/2007 | Sasaki .................. G02B 6/3885 385/89 |
| 2011/0286691 A1 | 11/2011 | Hopkins et al. |
| 2013/0022319 A1 | 1/2013 | Chang |
| 2013/0156386 A1 | 6/2013 | Miller |

FOREIGN PATENT DOCUMENTS

| | | |
|---|---|---|
| JP | 2005216530 | 8/2005 |
| WO | WO-2013162550 | 10/2013 |
| WO | WO-2013165356 | 11/2013 |

* cited by examiner

ATTACHING CONNECTORS

BACKGROUND

Electronic components can be optically connected to each other to allow for communication of optical signals between the electronic components. For example, an electronic device having an optical connector can be connected to a backplane infrastructure that has a mating optical connector. Alternatively, electronic devices having respective optical connectors can be optically connected to each other.

BRIEF DESCRIPTION OF THE DRAWINGS

Some implementations are described with respect to the following figures.

DETAILED DESCRIPTION

A system (such as a computer, smartphone, personal digital assistant, game appliance, storage device, communication device, etc.) can include components that have connectors to establish communications with other components. A connector can be used to communicatively couple electronic components such as processors, memory devices, input/output devices, servers, circuit boards, and so forth.

Connectors can include electrical connectors that have electric contacts to allow components to communicate electrical signals and/or power. Additionally, connectors can include optical connectors that allow for optical communications between components. The presence of both electrical and optical connectors in a system can lead to various issues. For example, mounting both electrical and optical connectors on a circuit board or other support structure can occupy valuable space on the circuit board or other support structure. A circuit board can refer to a structure on which components can be mounted, where the structure can include communication channels (electrical traces, optical channels, and so forth) to allow for communication among the components. Also, providing both optical and electrical connectors in a system can lead to complexities associated with installing components in the system.

In accordance with some implementations, removably attachable electrical and optical connectors are employed to enhance user convenience in installing components in a system in which both electrical and optical communications are used. An electrical connector and an optical connector are removably attachable to each other if the electrical connector and optical connector can be physically attached and detached by a user, tool, or machine.

Figure 1A:
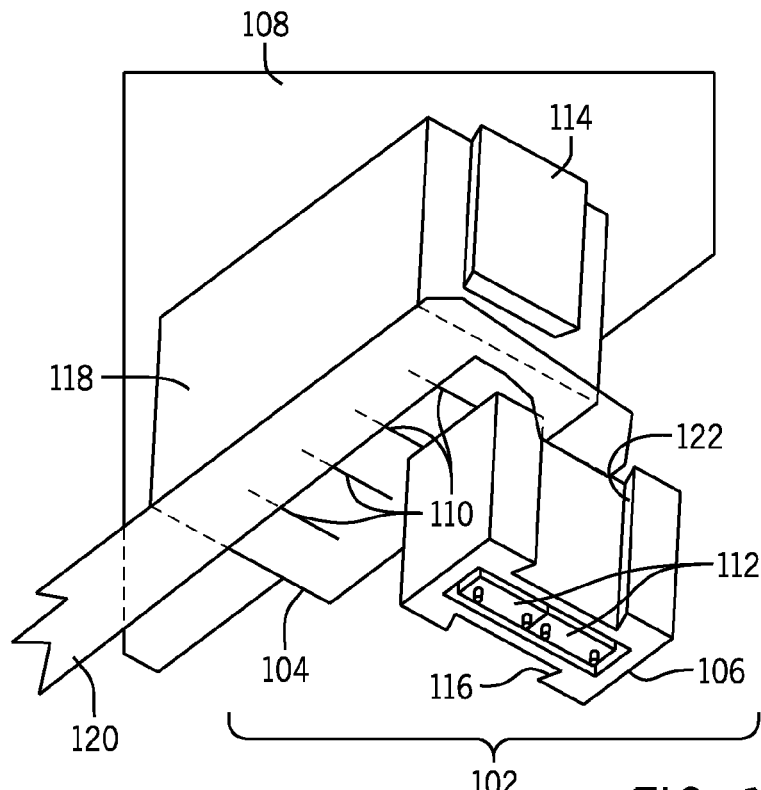
FIGS. 1A-1C depict different perspective views of a connector assembly including connectors that are removably attachable to each other, in accordance with some implementations.
Figure 1B:
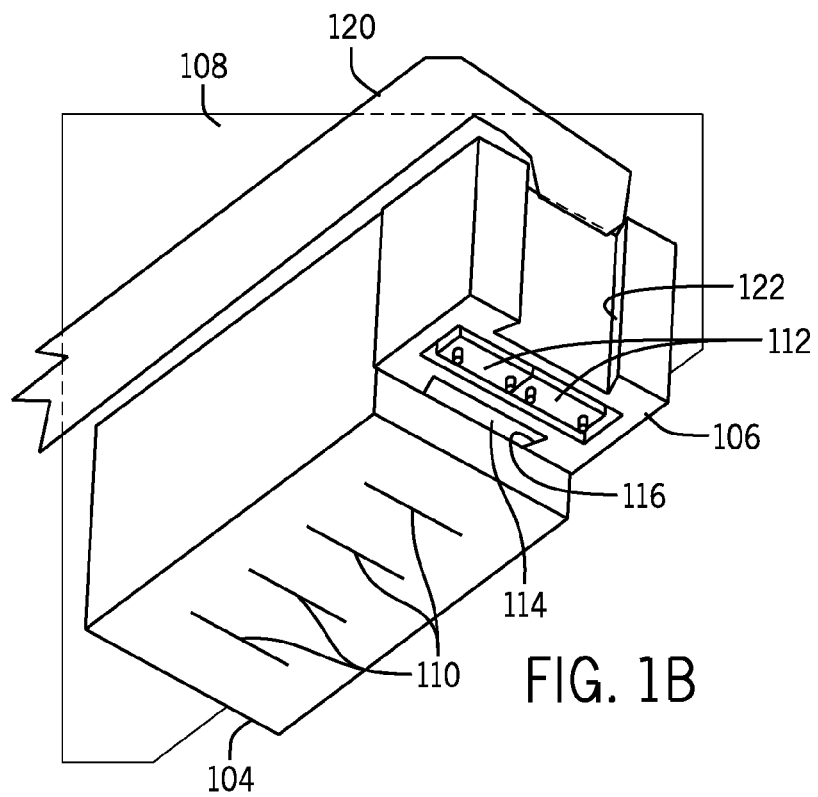
Figure 1C:
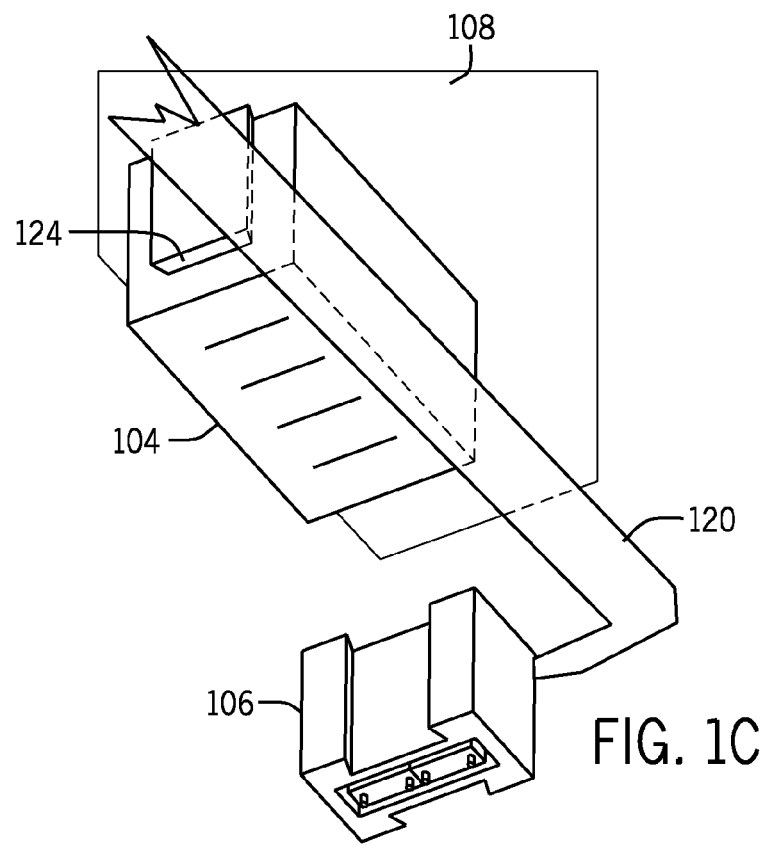

FIGS. 1A-1C are schematic views of a connector assembly 102 that includes an electrical connector 104 and an optical connector 106. In the example of FIG. 1A, the electrical connector 104 is mounted to a circuit board 108. The view of FIG. 1A shows the electrical connector 104 depending downwardly from the circuit board 108, since it is assumed in the example of FIG. 1A that the circuit board 108 is a daughter circuit board that is for mounting to a main circuit board (not shown). The electrical connector 104 has electrical communication elements 110 (e.g. contact pins, contact receptacles, etc.) that can be electrically contacted to another component (not shown in FIGS. 1A-1C).

The optical connector 106 has optical communication elements 112 for establishing optical communications with another component (not shown in FIGS. 1A-1C). The optical communication elements 112 can include optical ferrules, or other types of optical communication elements In the view of FIG. 1A, the optical connector 106 is removed and separated from the electrical connector 104. The electrical connector 104 has an attachment feature (e.g. protruding member 114), and the optical connector 106 has a corresponding mating attachment feature (e.g. groove 116). In the example of FIG. 1A, the protruding member 114 protrudes from a side of a housing 118 of the electrical connector 104. The groove 116 of the optical connector 106 is to receive the protruding member 114. The protruding member 114 is slidable with respect to the groove 116, such that the optical connector 106 can be slidably attached to the electrical connector 104 by sliding engagement of the protruding member 114 and the groove 116.

In other examples, other types of attachment features can be provided on the connectors 104 and 106.

Physical attachment of the optical connector 106 with the electrical connector 104 is depicted in FIG. 1B, where the protruding member 114 of the electrical connector 104 has been fully received in the groove 116 of the optical connector 106. In this manner, a user-friendly attachment mechanism is provided to allow for a user to form the connector assembly 102 that has the electrical connector 104 and the optical connector 106.

As depicted in FIGS. 1A and 1B, an optical cable 120 is optically connected to the optical connector 106. The optical cable 120 can include one or more optical fibers or waveguides for carrying optical signals. Thus, any component that is optically connected to the optical connector 106 can perform optical communications with another component connected to the optical cable 120. Similarly, a component electrically connected the electrical connector 104 can perform communications with another component coupled to the circuit board 108.

Note that although the optical connector 106 is physically attached to the electrical connector 104, no communication connection is established between the optical connector 106 and the electrical connector 104. In other words, there is no connection between the optical connector 106 and electrical connector 104 to allow for communication of signals and power between the connectors.

In alternative implementations, an optical connector can be mounted to the circuit board 108, while an electrical connector (with electrical cables, flex circuit, etc.) can be removably attachable to the optical connector.

As further shown in FIGS. 1A-1B, the optical connector 106 has another groove 122 on the opposite side of the optical connector 106 from the groove 116. The groove 122 can be used to physically attach the optical connector 106 to another connector, which can be an electrical connector or an optical connector. In this way, more than two connectors can be cascaded together by physically attaching such connectors using the attachment mechanism according to some implementations.

More generally, a connector has a communication element to communicate with another component. This communication element can be an electrical communication element or an optical communication element. A first connector includes an attachment feature, and a second connector is removably attachable to the attachment feature of the first connector without establishing communication with the first connector. One of the first and second connectors is an optical connector, while the other of the first and second connectors is an electrical connector. In other implementations, instead of including just first and second connectors that are physically attachable to each other, a connector assembly can include more than two connectors that are removably attachable to each other.

FIG. 1C is a different perspective view of the connectors 104 and 106. In the view of FIG. 1C, the opposite ends of the electrical connector 104 and optical connector 106 are shown as compared to the ends depicted in FIG. 1A. As shown in FIG. 1C, the other end of the electrical connector 104 also includes an attachment feature, which can be a protruding member 124 similar to the protruding member 114 shown in FIG. 1A. This protruding member 124 can be used to removably attach an optical connector or an electrical connector to the electrical connector 104.

Figure 2:
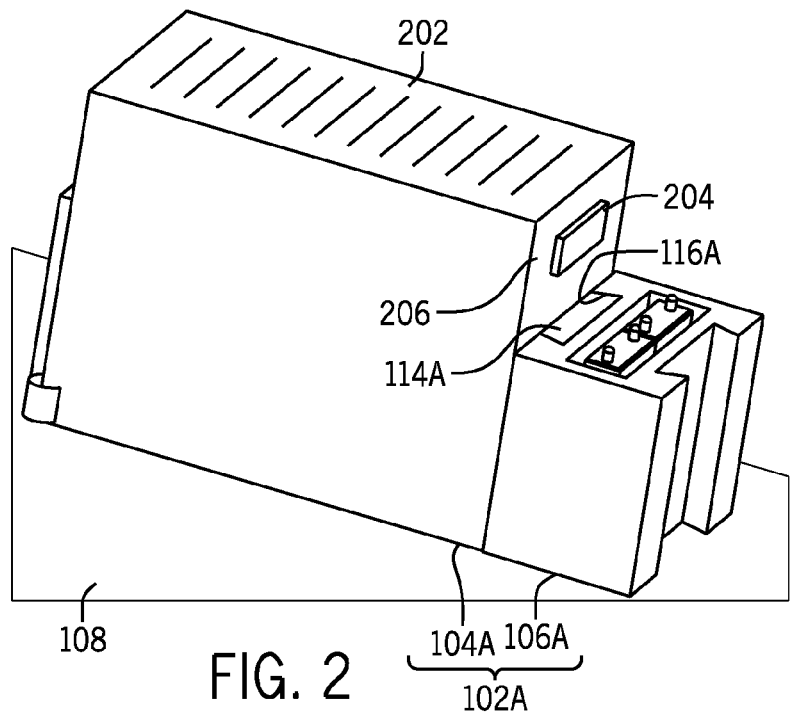
FIG. 2 is a perspective view of removably attachable connectors according to further implementations.

FIG. 2 is a perspective view of a connector assembly 102A according to further implementations. The view of the connector assembly 102A in FIG. 2 is upside-down from the view of the connector assembly 102 in FIG. 1A.

The connector assembly 102A includes an electrical connector 104A and an optical connector 106A. The electrical connector 104A has a mating socket 202 that has electrical communication elements. The socket 202 may have a mechanical feature 204, such as retention or alignment feature, on its side to allow the socket 202 to be frictionally engaged with a mating socket of another electrical connector. The mechanical feature 204 protrudes outwardly from a side wall 206 of the socket 202. When the optical connector 106A is detached from or attached to the electrical connector 104A, the optical connector 106A slides up or down (in the view of FIG. 2) along the side wall 206 of the socket 202.

By providing the groove 116A in the optical connector 106A, a clearance is provided to allow the optical connector 106 to slide over the mechanical feature 204, as the optical connector 106A is detached from or attached to the electrical connector 104A. The groove 116A of the optical connector 106A engages with a protruding member 114A of the electrical connector 104A. As the optical connector 106A slides upwardly in the view of FIG. 2, the groove 116A passes over the mechanical feature 204, to allow the optical connector 106A to clear over the mechanical feature 204 and to be removed from the electrical connector 104A.

Figure 3:
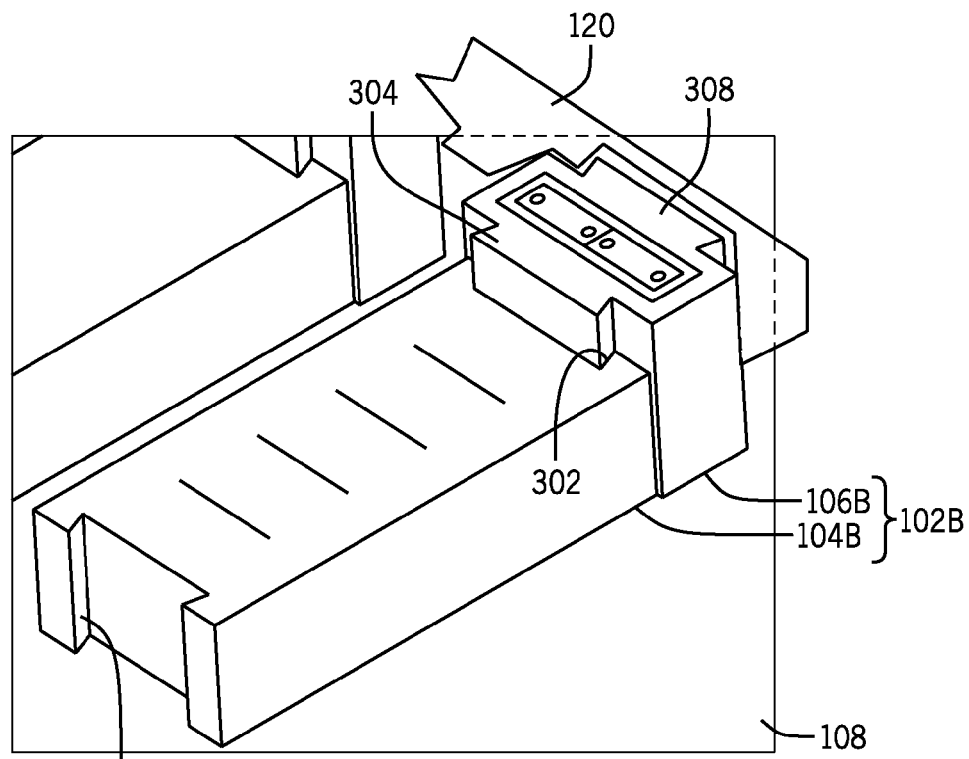
FIG. 3 is a perspective view of removably attachable connectors, according to alternative implementations.

FIG. 3 is a perspective view of a connector assembly 102B according to alternative implementations. The connector assembly 102B includes an electrical connector 104B and an optical connector 106B. The view of the connector assembly 102B in FIG. 3 is upside-down from the view of the connector assembly 102 of FIG. 1A.

The attachment features of the electrical connector 104B and optical connector 106B are different from the respective attachment features depicted in FIG. 1A. In FIG. 3, an attachment feature of the electrical connector 104B is a groove 302, for sliding engagement with an attachment feature that is a protruding member 304 of the optical connector 106B. The other end of the electrical connector 104B also includes a groove 306 for removable attachment to another connector. Similarly, the other end of the optical connector 106B also has an attachment feature (e.g. a protruding member 308), for removable attachment to another connector. Alternatively, the protruding member 308 can be substituted with another type of attachment feature, such as a groove for removable attachment to another connector.

Figure 4:
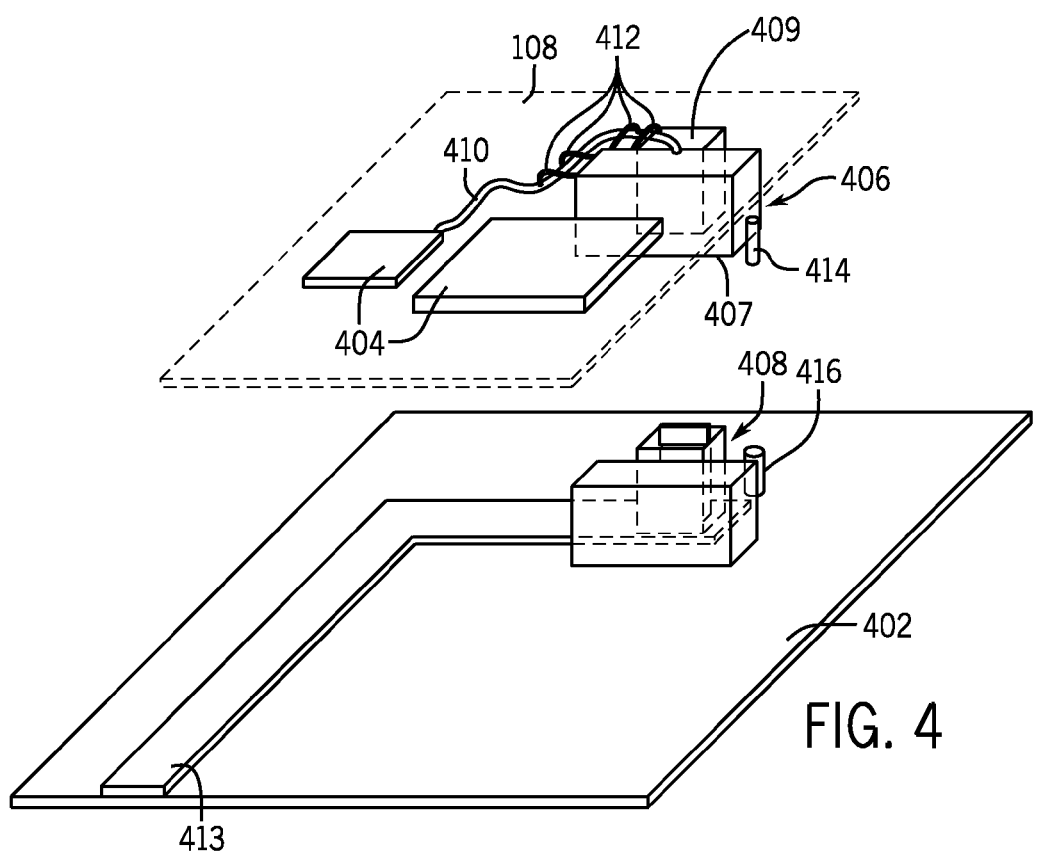
FIG. 4 is a schematic view of circuit boards having connector assemblies according to some implementations.

FIG. 4 is a schematic diagram showing two circuit boards having respective connector assemblies for connection to each other. In the example of FIG. 4, the circuit board 108 can be a daughter circuit board, while a circuit board 402 can be a main circuit board, also referred to as a motherboard. The circuit board 108 (in dashed profile in FIG. 4) is depicted as being transparent to allow components 404 mounted to the lower surface of the circuit board 108 to be visible in FIG. 4. An alternative design may allow components 404 mounted to the upper surface of the circuit board 108. The components 404 can include integrated circuit devices, such as a microprocessor, a microcontroller, an application-specific integrated circuit (ASIC) device, a memory device, an I/O device, an electro-optical converter, and so forth.

A connector assembly 406 has an electrical connector 407 and an optical connector 409 mounted to the lower surface of the circuit board 108, while a mating connector assembly 408 is mounted to an upper surface of the circuit board 402. Each of the connector assemblies 406 and 408 can include any of the connector assemblies depicted in FIGS. 1A-3.

An optical cable 410 is connected between a component 404 and the optical connector of the connector assembly 406. This component 404 connected to the optical cable 410 can be an electrical-optical converter, for example, to convert between electrical and optical signals. As further shown in FIG. 4, clips 412 or other types of attachment elements can be used to fix the position of a portion of the optical cable 410.

On the circuit board 402, an optical cable 413 is optically connected to the optical connector of the connector assembly 408. In addition, the connector assemblies 406 and 408 include alignment features 414 and 416, respectively, to physically align of the connector assemblies 406 and 408 as the connector assemblies are brought into engagement with each other. In the example of FIG. 4, the alignment features 414 and 416 include a pin and slot arrangement; in other examples, other types of alignment features can be used.

Figure 5A:
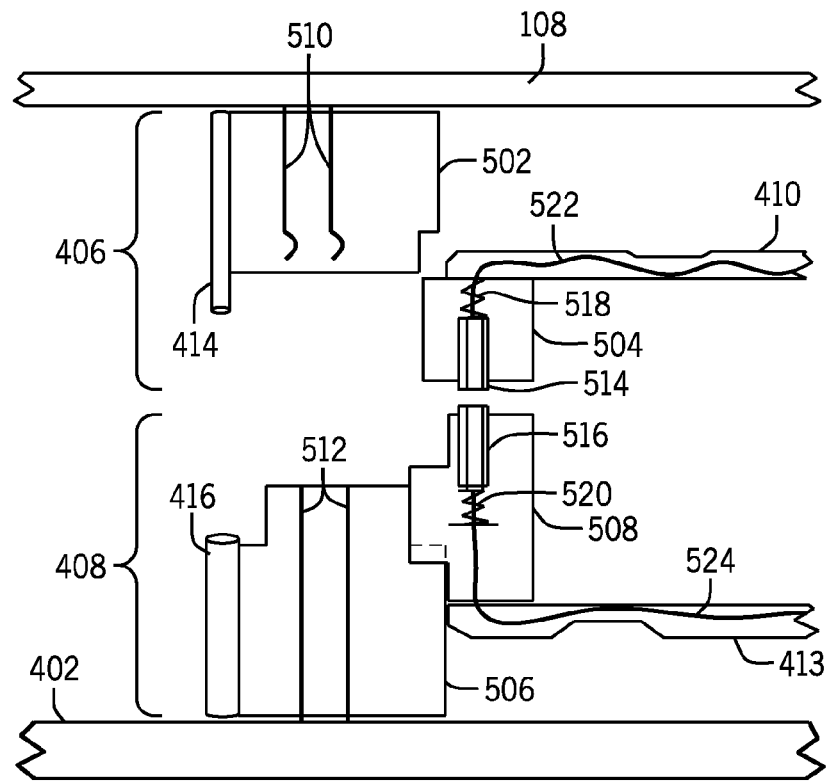
FIGS. 5A-5C are side views of connector assemblies that are connectable to each other, according to some implementations.
Figure 5B:
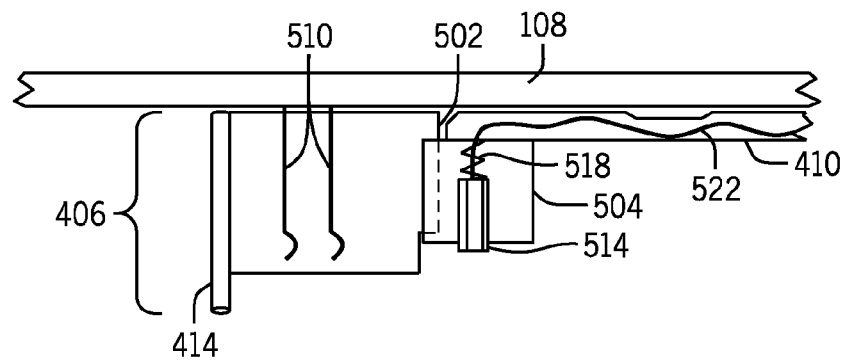
Figure 5B:
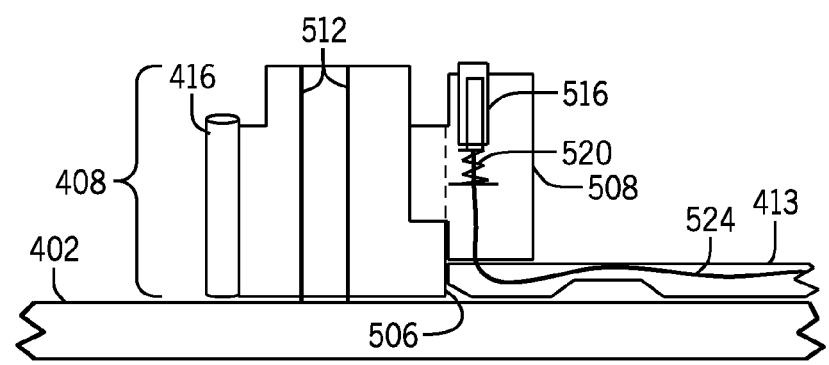
Figure 5C:
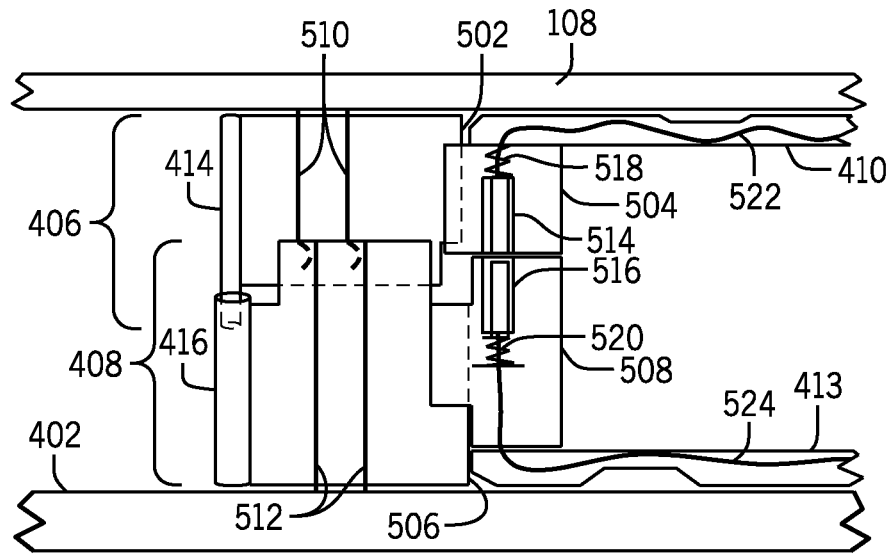

FIGS. 5A-5C are side schematic views of the arrangement shown in FIG. 4, according to further implementations. In the view of FIG. 5A, the electrical connector and the optical connector of each of the connector assemblies 406 and 408 are physically removed from each other. The connector assembly 406 includes an electrical connector 502 and an optical connector 504 that are removably attachable to each other. The connector assembly 408 includes an electrical connector 506 and an optical connector 508 that are removably attachable to each other.

The electrical connector 502 includes electrical communication elements 510, and the electrical connector 506 includes electrical communication elements 512.

The optical connector 504 has an optical communication element 514, and the optical connector 508 has an optical communication element 516. The optical communication elements 514 and 516 can include optical ferrules, or other types of optical communication elements.

As further shown in FIG. 5A, a biasing element 518 for biasing a portion of the optical communication element 514 outside of the housing of the optical connector 504 is provided. In the view of FIG. 5A, the biasing element 518 biases the optical communication element 514 downwardly. The biasing element 518 can be a spring, in some examples. Similarly, the optical connector 508 includes a biasing element 520, which can be a spring, for biasing a portion of the optical communication element 516 outside the housing of the optical connector 508. In the view of FIG. 5, the biasing element 520 biases the optical connector 508 upwardly.

One or multiple optical fibers 522 extend from the optical communication element 514 into the optical cable 410. Similarly, one or multiple optical fibers 524 extend from the optical communication element 516 into the optical cable 413.

FIG. 5B shows the optical and electrical connectors of each of the connector assemblies 406 and 408 physically attached together, using the attachment features as discussed above with respect to FIGS. 1A-3.

FIG. 5C shows the connector assemblies 406 and 408 brought into engagement with each other, as aligned by the alignment features 414 and 416. When engaged, the electrical communication elements 510 of the electrical connector 502 electrically contact the electrical communication elements 512 and the electrical connector 506.

Similarly, the optical communication elements 514 and 516 are brought into contact or close proximity with each other. When the optical connectors 504 and 508 are engaged as shown in FIG. 5C, the optical communication element 514 is pushed inwardly into the housing of the optical connector 504, to compress the biasing element 518, while the optical connection 516 is pushed inwardly into the housing of the optical connector 508, to compress the biasing element 520.

In some examples, physical contact of the optical communication elements 514 and 516 will push the respective optical communication elements into their respective optical connectors 504 and 508. In other examples, the optical connectors 504 and 508 can have other features for engaging the respective optical communication elements 514 and 516 for pushing the optical communication elements into the respective housings of the optical connectors 504 and 508.

Figure 6:
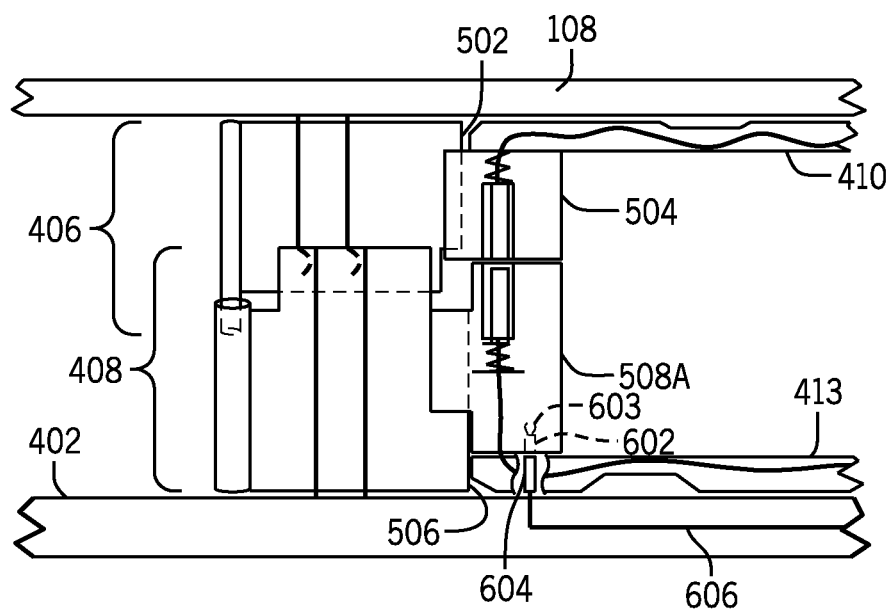
FIGS. 6 and 7 are side views of connector assemblies including presence detect mechanisms, according to further implementations.

FIG. 6 illustrates the assembly shown in FIG. 5C, with the addition of a presence detect mechanism. In FIG. 6, the presence detect mechanism includes a first electrical contact 602 in the optical connector 508A, and a second electrical contact 604 that is mounted on the circuit board 402. When the optical connector 508A is physical attached to the electrical connector 506, the electrical contacts 602 and 604 are electrically connected to each other. The first electrical contact 602 can include a short circuit, for example, such that when the electrical contacts 602 and 604 are electrically connected, an electrical circuit is established. When the electrical contacts 602 and 604 are connected, a signal having a reference voltage is provided on an electrical conductor 606 that extends through the circuit board 402. This signal can be a presence detect signal that can be received by a controller (not shown) on the circuit board 402 or elsewhere.

The presence detect signal indicates to the controller that the optical connector 508A has been physically attached to the electrical connector 506. The controller can perform a specified action in response to the presence detect signal.

Figure 7:
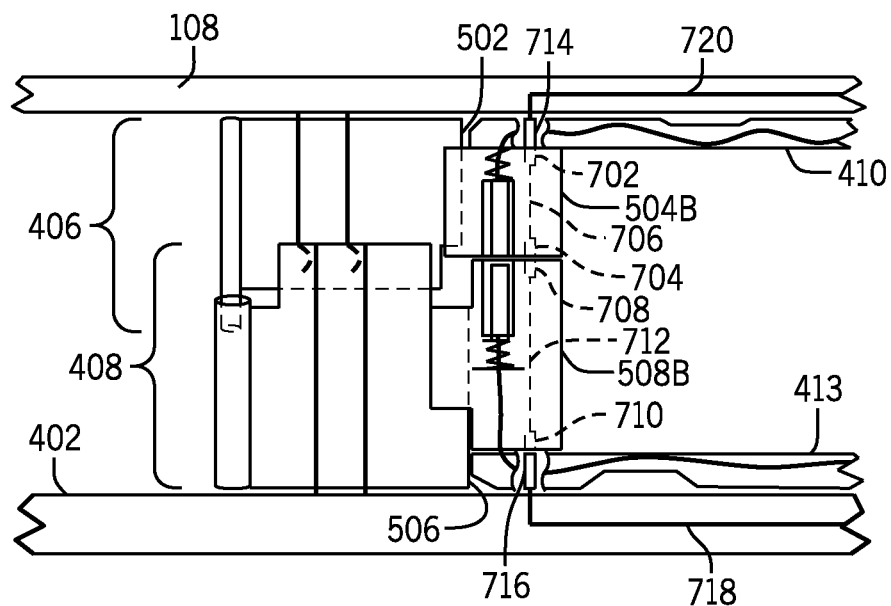

FIG. 7 shows another example of a presence detect mechanism. The presence detect mechanism includes circuitry in both optical connectors 504B and 508B, which are part of the connector assemblies 406 and 408, respectively. The optical connector 504B has electrical contacts 702 and 704 that are electrically connected to each other by an electrical conductor 706. Similarly, the optical connector 508B includes an electrical contact 708 and an electrical contact 710 that are electrically connected to each other by an electrical conductor 712.

The electrical contact 702 of the optical connector 504B is electrically connected to an electrical contact 714 (mounted on the circuit board 108) when the optical connector 504B is physically attached to the electrical connector 502. Similarly, the electrical contact 710 of the optical connector 508B is electrically connected to an electrical contact 716 mounted to the circuit board 402 when the optical connector 508B is physically attached to the electrical connector 408.

The electrical contact 714 mounted on the circuit board 108 is connected to an electrical conductor 720 in the circuit board 108, which can be tied to a reference voltage or a short-circuit path for presence detect purposes, for example. The electrical contact 716 can be connected to an electrical conductor 718 in the circuit board 402, where the electrical conductor 718 carries a presence detect signal to indicate to a controller that the optical connectors 504B and 508B have been respectively attached to electrical connectors 502 and 506, and that the optical connectors 504B and 508B have been engaged with each other. In another example, the electrical conductor 720 may be connected to a tag or a non-volatile memory device that contains configuration information of an optical signal path. The controller connected to the electrical conductor 718 can read the tag or memory device, and can perform a specified action in response to the configuration information.

Figure 8:
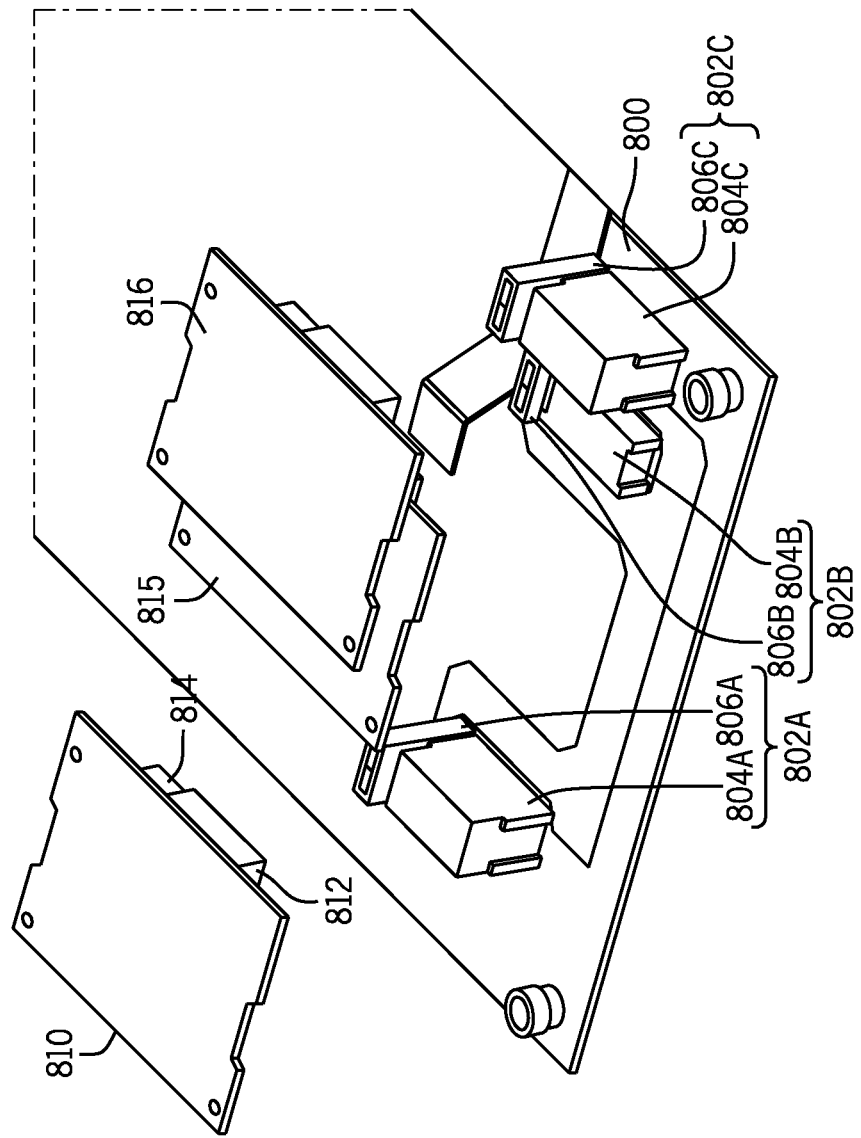
FIG. 8 is a perspective view of a portion of an example system according to some implementations.

FIG. 8 is a perspective view of a portion of a system that includes a main circuit board 800 on which are mounted connector assemblies 802A, 802B, and 802C, according to some implementations. The connector assembly 802A includes an electrical connector 804A and an optical connector 806A, where the electrical and optical connectors 804A and 806A can be removably attachable to each other using the attachment features discussed above. Similarly, the connector assembly 802B includes an electrical connector 804B and an optical connector 806B. In addition, the connector assembly 802C includes an electrical connector 804C and an optical connector 806C. Note that the connector assembly 802B has a lower height than the connector assemblies 802A and 802C.

Corresponding daughter circuit boards 810, 815, and 816 carry connector assemblies to respectively engage with the connector assemblies 802A, 802B, and 802C. The connector assembly on the daughter circuit board 810 includes an electrical connector 812 and an optical connector 814, for example.

Although three daughter circuit boards 810, 815, and 816 are shown, it is noted that in alternative implementations, the connector assemblies for engagement with the connector assemblies 802A, 802B, and 802C can be provided on one circuit board, and these connector assemblies can be simultaneously engaged with the connector assemblies 802A, 802B, and 802C.

Figure 9:
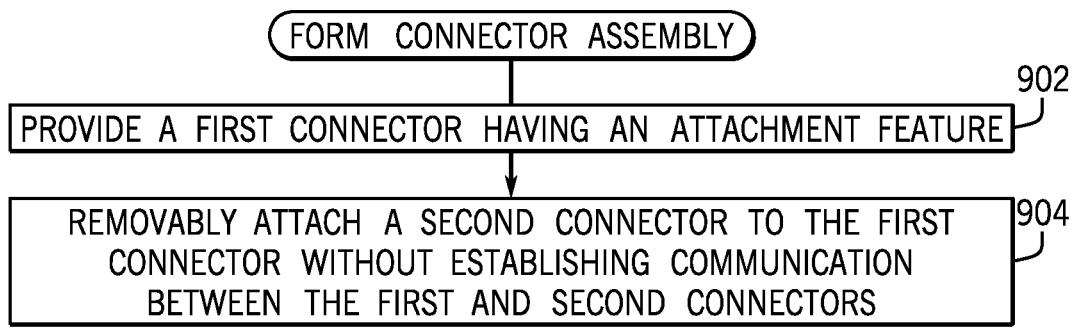
FIG. 9 is a flow diagram of forming a connector assembly according to some implementations.

FIG. 9 is a flow diagram of a process of forming a connector assembly according to some implementations. The process provides (at 902) a first connector that has an attachment feature. A second connector is removably attached (at 904) to the first connector without establishing communication between the first and second connectors.

What is claimed is:

1. A connector assembly comprising:
   a first connector including a communication element to communicate with a component, the first connector further including an attachment feature; and
   a second connector including a communication element to communicate with another component, the second connector removably attachable to the attachment feature of the first connector without establishing communication with the first connector,
   wherein one of the first and second connectors is an optical connector, and another of the first and second connectors is an electrical connector.

2. The connector assembly of claim 1, wherein the first connector further includes a second attachment feature for removable attachment to a third connector.

3. The connector assembly of claim 1, wherein the second connector includes an attachment feature for removable attachment to a third connector.

4. The connector assembly of claim 1, wherein the attachment feature includes one of a protruding member and a groove, and the second connector has one of a groove and a protruding member to engage with the protruding member or groove of the first connector.

5. The connector assembly of claim 1, further comprising a presence detect mechanism to indicate attachment of the second connector to the first connector.

6. The connector assembly of claim 1, wherein the first connector includes a mechanical feature that protrudes from a wall of the first connector, and wherein the second connector has a groove to provide clearance over the mechanical feature as the first and second connectors are attached together or detached from one another, and wherein the groove of the second connector is to engage with the attachment feature of the first connector.

7. The connector assembly of claim 1, further comprising an alignment feature to align the connector assembly with another connector assembly when the connector assemblies are being engaged.

8. The connector assembly of claim 1, wherein the second connector is an optical connector, and the communication element of the second connector is an optical communication element, the second connector further comprising a biasing element to bias a portion of the communication element of the second connector outside a housing of the second connector.

9. The connector assembly of claim 8, wherein the communication element of the second connector is pushed into the housing against the biasing element as the connector assembly is brought into engagement with another connector assembly.

10. A method comprising:
    providing a first connector including a communication element to communicate with a component, the first connector further including an attachment feature; and
    removably attaching an attachment feature of a second connector to the attachment feature of the first connector, the second connector including a communication element to communicate with another component, the second connector being removably attachable to the first connector without establishing communication between the first connector and the second connector,
    wherein one of the first and second connectors is an optical connector, and another of the first and second connectors is an electrical connector.

11. The method of claim 10, wherein removably attaching an attachment feature of a second connector to the attachment feature of the first connector comprises attaching a protruding member to a groove.

12. The method of claim 10, wherein the first connector is mounted to a circuit board.

13. A system comprising:
    a circuit board;
    first connectors mounted to the circuit board, each of the first connectors including a respective attachment feature; and
    second connectors removably attachable to the respective first connectors via the respective attachment feature without establishing communication between the first connectors and the respective second connectors,
    wherein the first connectors include one of optical connectors and electrical connectors, and the second connectors include another one of optical connectors and electrical connectors.

14. The system of claim 13, wherein each pair of the first and second connectors form a respective connector assembly, and wherein a height of a first of the connector assemblies is different from a height of a second of the connector assemblies.

15. The system of claim 13, wherein each pair of the first and second connectors form a respective connector assembly, further comprising:
    additional connector assemblies for engagement with the connector assemblies on the circuit board.

16. The method of claim 10, further comprising:
    detecting attachment of the second connector to the first connector via a presence detect mechanism.

17. The method of claim 10, wherein the first connector further includes a second attachment feature for removable attachment to a third connector without establishing communication between the first connector and the third connector.

18. The system of claim 15, wherein each respective connector assembly includes a presence detect mechanism to indicate attachment of the second connector to the first connector.

19. The system of claim 15, wherein each respective connector assembly includes an alignment feature to align the connector assembly with another connector assembly when the connector assemblies are being engaged.

20. The system of claim 13, wherein the respective attachment feature of the first connectors includes one of a protruding member and a groove, and the second connectors have one of a groove and a protruding member to engage with the protruding member or groove of the first connectors.

* * * * *